Oct. 16, 1928.

F. M. CASE

FISHING REEL 1,688,135

Original Filed March 31, 1923

Inventor
Francis M. Case
By Brockett & Hyde
Attorneys

Patented Oct. 16, 1928.

1,688,135

UNITED STATES PATENT OFFICE.

FRANCIS M. CASE, OF CLEVELAND HEIGHTS, OHIO, ASSIGNOR TO THE ENTERPRISE MANUFACTURING COMPANY, OF AKRON, OHIO, A CORPORATION OF OHIO.

FISHING REEL.

Original application filed March 31, 1923, Serial No 629,040. Divided and this application filed November 19, 1926. Serial No. 149,395.

This invention relates to improvements in the level wind mechanism of fishing reels, the present application being a division of my co-pending application for fishing reels, filed March 31, 1923, Ser. No. 629,040.

One of the objects of the present invention is the provision of recesses in the reel end heads to provide a clearance beyond the range or limits of movement of the line laying carriage, so that the line cannot be pinched or caught between said carriage and the reel end heads.

A further object of the invention is the provision of spring pressed means for taking up lost motion and for effectively maintaining three parts of the level wind mechanism in proper position, to wit, the reversely threaded shaft, the slotted tube enclosing said shaft and the closure for the reel end head opening through which said shaft and said tube are adapted for endwise movement in assembling and disassembling the level wind mechanism.

Further objects of the invention are in part obvious and in part will appear more in detail hereinafter.

Figure 1:
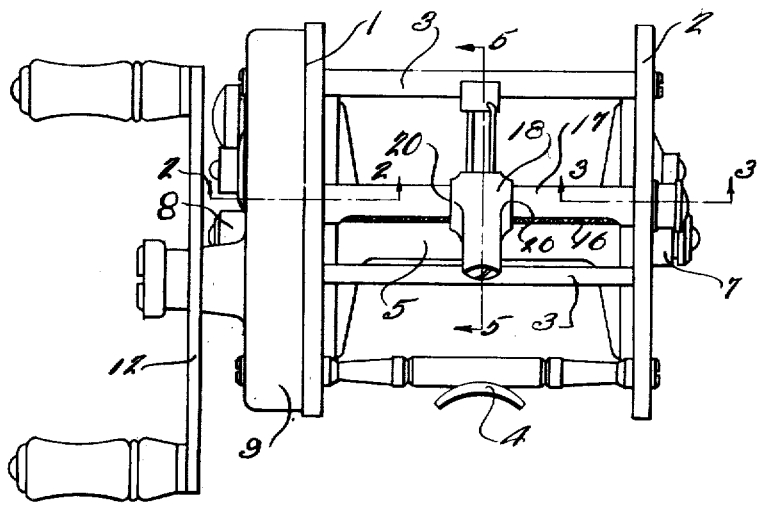
Figures 2, 3:
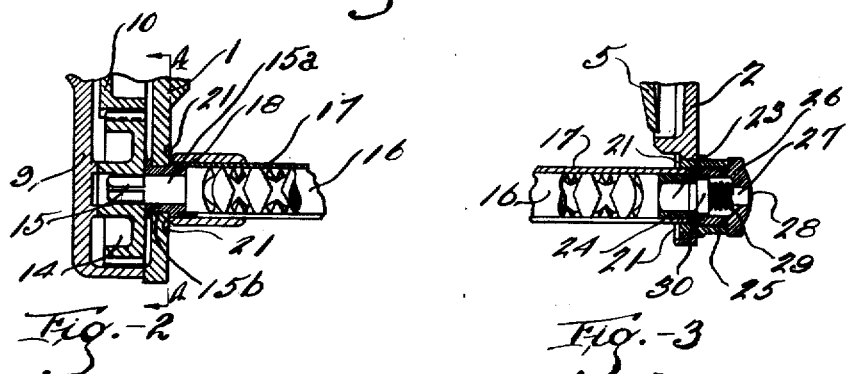
Figure 4:
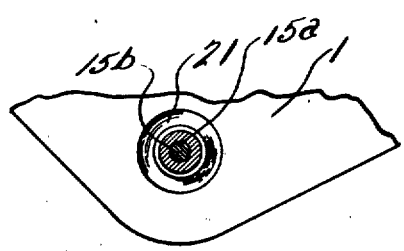
Figure 5:
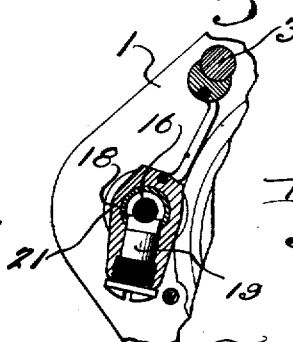

In the drawings, Fig. 1 is a side elevation of a fishing reel embodying my invention; Fig. 2 is a detail sectional view on the line 2—2, Fig. 1; Fig. 3 is a detail sectional view on the line 3—3, Fig. 1; Fig. 4 is a detail sectional view on the line 4—4, Fig. 2; and Fig. 5 is a detail sectional view on the line 5—5, Fig. 1.

The reel illustrated in the drawings comprises the usual frame including end heads 1, 2, connected by pillars 3 and having a foot plate 4 for attachment of the reel to a fishing rod. Between the end heads is located a rotatable spool 5 mounted upon a shaft or spindle (not shown) journalled in bearings marked generally 7, 8, the first of which is suitably mounted in an opening in the reel end head 2 and the latter of which is suitably mounted in an opening in a cap or cover 9 which cooperates with the end head 1 as an enclosure or casing for the operating gearing. Said gearing includes a gear 10, upon the hub (not shown) of which is operatively connected the driving crank 12. Said gear meshes with the drives a pinion 14 adapted for driving connection with the non-circular portion 15 of the reversely threaded shaft 16 of the reel level wind mechanism. Said shaft is enclosed within a slotted tube 17 for shaft protection and also to form a bearing along which slides the line laying carriage 18, a removable dog 19 of which engages the threads of the shaft 16 through the slot in the tube 17, whereby rotation of the shaft 16 effects the back and forth movement of the carriage, as is usual.

Said line laying or level wind carriage is shown as being provided at its opposite sides with projections 20 (Fig. 1) which are adapted to approach but not enter recesses 21 in the reel end heads 1 and 2. These recesses furnish clearance beyond the range or limit of movement of the line guiding carriage, as clearly indicated in Fig. 2, so that the line cannot be pinched or caught between said carriage and the reel end heads when said carriage is at the extremities or limits of its range of movement.

The reversely threaded shaft 16 and its enclosing tube 17 are readily removable from the reel without disturbing the reel end heads or disassembling the main operating parts of the reel. For this purpose, said shaft at one end has a reduced portion, the part 15 of which is square for driving connection with pinion 14, as before mentioned, and the cylindrical part $15^a$ of which is journalled in a flanged sleeve $15^b$ permanently mounted within an opening in the end head 1. The other end of the shaft 16 has a reduced extension 23 journalled in a sleeve 24, which in turn lies within an end portion of the shaft tube 17. Said sleeve and said tube lie within an internally threaded outwardly extending tubular member 25 permanently arranged within an opening in the reel end head 2, and through the opening in said member 25 the shaft 16, the tube 17 and the sleeve 24 may be endwise inserted and removed. Threaded to member 25 is a cap or closure 26 within which is a headed plunger 27 having slight longitudinal motion relative to said cap and being permanently attached thereto by its upset end head 28. A compression spring 29 urges the head 30 of said plunger inwardly against the flanged outer end of sleeve 24. The yielding pressure of said spring takes up any endwise motion of the shaft and sleeve and may be increased as may be necessary in case of wear or accrued lost motion due to any cause, and also, produces a yielding frictional effect upon the threaded cap and locks or holds it in the position in which it may be adjusted and thereby prevents its loss. The arrangement enables the threaded shaft, the tube 17 and the sleeve 24 to be readily removed for inspection, repair or replacement or for simple reel assembly.

What I claim is:

1. A fishing reel, comprising a frame having spaced end heads, a line receiving spool rotatably mounted in said frame, and a line guiding carriage movable back and forth between the inner faces of said end heads, said end heads being provided with means aligned with said carriage for providing clearance to avoid pinching the line between said carriage and said end heads.

2. A fishing reel, comprising a frame having spaced end heads, a line receiving spool rotatably mounted in said frame, and a line guiding carriage movable back and forth between inner faced portions of said end heads, said end heads having clearance-providing recesses about the faced portions thereof to avoid pinching the line.

3. A fishing reel, comprising spaced end heads, a line receiving spool rotatable therebetween, and level wind mechanism including a shaft structure extending between said end heads and being movable endwise through an aperture in one of said end heads, a removable closure for the aperture in said end head, and yielding means interposed between said shaft structure and said closure.

4. A fishing reel, comprising spaced end heads, a line receiving spool rotatable therebetween, and level wind mechanism including a shaft structure extending between said end heads and being movable endwise through an aperture in one of said end heads, a removable closure for the aperture in said end head, and a spring interposed between said shaft structure and said closure.

5. A fishing reel, comprising spaced end heads, a line receiving spool rotatable therebetween, and level wind mechanism including a shaft structure extending between said end heads and being movable endwise through an aperture in one of said end heads, a removable closure for the aperture in said end head, and spring means tending to maintain said shaft structure and said closure in assembled position.

6. A fishing reel, comprising spaced end heads, a line receiving spool rotatable therebetween, and level wind mechanism including a shaft structure extending between said end heads and being movable endwise through an aperture in one of said end heads, a removable closure for the aperture in said end head, and spring means interposed between said shaft structure and said closure and tending to maintain said shaft structure and said closure in assembled position.

7. A fishing reel, comprising spaced end heads, a line receiving spool rotatable therebetween, and level wind mechanism including a shaft structure extending between said end heads and being movable endwise through an aperture in one of said end heads, a removable closure for the aperture in said end head, and a single spring tending to maintain said shaft structure and said closure in assembled position.

8. A fishing reel, comprising spaced end heads, a line receiving spool rotatable therebetween, and level wind mechanism including a shaft structure extending between said end heads and being movable endwise through an aperture in one of said end heads, a removable closure for the aperture in said end head, and spring means interposed between said shaft structure and said closure and tending to maintain said shaft structure and said closure in assembled position, said spring means being so associated with said closure that said closure and said spring means may be handled as a unit.

9. A fishing reel, comprising spaced end heads, a line receiving spool rotatable therebetween, and level wind mechanism including a shaft structure comprising a shaft extending between said end heads and a slotted tube surrounding said shaft, said shaft and said tube being movable endwise through an aperture in one of said end heads, a removable closure for the aperture in said end heads, and spring means interposed between said shaft structure and said closure.

10. A fishing reel, comprising spaced end heads, a line receiving spool rotatable therebetween, and level wind mechanism including a shaft structure extending between said end heads and being movable endwise through an aperture in one of said end heads, a removable closure for the aperture in said end head, a longitudinally movable plunger carried by said closure, and spring means for moving said plunger into engagement with said shaft structure.

11. A fishing reel, comprising spaced end heads, a line receiving spool rotatable therebetween, and level wind mechanism including a shaft structure extending between said end heads and being movable endwise through an aperture in one of said end heads, a removable closure for the aperture in said end head, a longitudinally movable headed plunger carried by said closure, and a spring surrounding said plunger for moving the head thereof into engagement with said shaft structure.

12. A fishing reel, comprising spaced end heads, a line receiving spool rotatable therebetween, and level wind mechanism including a shaft structure extending between said end heads and being movable endwise through an aperture in one of said end heads, a movable closure for the aperture of said end head, and yielding means associated with said closure and tending to maintain said closure in position, said yielding means being free of engagement with said end head.

13. A fishing reel, comprising spaced end heads, a line receiving spool rotatable therebetween, and level wind mechanism including a shaft structure extending between said end heads and being movable endwise through an aperture in one of said end heads, a movable closure for the aperture of said end head and a spring carried by said closure and tending to maintain said closure in position, said spring being free of engagement with said end head.

14. A fishing reel comprising a frame having spaced end heads, a line receiving spool rotatively mounted in said frame, and a line guiding carriage movable back and forth between inner faced portions of said end heads in alignment with said carriage, said end heads having clearance-providing annular recesses surrounding said faced portions to avoid pinching the line.

In testimony whereof I hereby affix my signature.

FRANCIS M. CASE.

CERTIFICATE OF CORRECTION.

Patent No. 1,688,135.   Granted October 16, 1928, to

FRANCIS M. CASE.

It is hereby certified that error appears in the printed specification of the above numbered patent requiring correction as follows: Page 1, line 51, for the article "the" read "and"; and that the said Letters Patent should be read with this correction therein that the same may conform to the record of the case in the Patent Office.

Signed and sealed this 27th day of November, A. D. 1928.

(Seal)

M. J. Moore,
Acting Commissioner of Patents.

DISCLAIMER 1,688,135.—*Francis M. Case*, Cleveland Heights, Ohio. FISHING REEL. Patent dated October 16, 1928. Disclaimer filed August 16, 1937, by the assignee, *The Enterprise Manufacturing Company*.

Hereby enters this disclaimer to that part of the claims in said specification, constituting claims 5 and 7.

[*Official Gazette August 31, 1937.*]

ing a shaft structure extending between said end heads and being movable endwise through an aperture in one of said end heads, a movable closure for the aperture of said end head, and yielding means associated with said closure and tending to maintain said closure in position, said yielding means being free of engagement with said end head.

13. A fishing reel, comprising spaced end heads, a line receiving spool rotatable therebetween, and level wind mechanism including a shaft structure extending between said end heads and being movable endwise through an aperture in one of said end heads, a movable closure for the aperture of said end head and a spring carried by said closure and tending to maintain said closure in position, said spring being free of engagement with said end head.

14. A fishing reel comprising a frame having spaced end heads, a line receiving spool rotatively mounted in said frame, and a line guiding carriage movable back and forth between inner faced portions of said end heads in alignment with said carriage, said end heads having clearance-providing annular recesses surrounding said faced portions to avoid pinching the line.

In testimony whereof I hereby affix my signature.

FRANCIS M. CASE.

CERTIFICATE OF CORRECTION.

Patent No. 1,688,135.            Granted October 16, 1928, to

FRANCIS M. CASE.

It is hereby certified that error appears in the printed specification of the above numbered patent requiring correction as follows: Page 1, line 51, for the article "the" read "and"; and that the said Letters Patent should be read with this correction therein that the same may conform to the record of the case in the Patent Office.

Signed and sealed this 27th day of November, A. D. 1928.

(Seal)

M. J. Moore,
Acting Commissioner of Patents.

DISCLAIMER 1,688,135.—*Francis M. Case*, Cleveland Heights, Ohio. FISHING REEL. Patent dated October 16, 1928. Disclaimer filed August 16, 1937, by the assignee, *The Enterprise Manufacturing Company*.

Hereby enters this disclaimer to that part of the claims in said specification, constituting claims 5 and 7.

[*Official Gazette August 31, 1937.*]

DISCLAIMER 1,688,135.—*Francis M. Case*, Cleveland Heights, Ohio. FISHING REEL. Patent dated October 16, 1928. Disclaimer filed August 16, 1937, by the assignee, *The Enterprise Manufacturing Company*.

Hereby enters this disclaimer to that part of the claims in said specification, constituting claims 5 and 7.

[*Official Gazette August 31, 1937.*]